United States Patent
Jimenez et al.

(10) Patent No.: US 10,622,801 B2
(45) Date of Patent: Apr. 14, 2020

(54) CIRCUIT INTERRUPTER WITH TEMPERATURE COMPENSATION AND METHOD OF OPERATING A CIRCUIT INTERRUPTER

(71) Applicant: EATON CORPORATION, Cleveland, OH (US)

(72) Inventors: Sandy Jimenez, Monaca, PA (US); Jian Jiao, Sewickley, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 286 days.

(21) Appl. No.: 15/659,927

(22) Filed: Jul. 26, 2017

(65) Prior Publication Data

US 2019/0036324 A1  Jan. 31, 2019

(51) Int. Cl.
| | |
|---|---|
| *H02H 3/10* | (2006.01) |
| *H02H 6/00* | (2006.01) |
| *H02H 3/093* | (2006.01) |
| *H01H 71/12* | (2006.01) |
| *H01H 71/10* | (2006.01) |
| *H02H 1/00* | (2006.01) |
| *H02H 3/08* | (2006.01) |
| *H01H 71/22* | (2006.01) |

(52) U.S. Cl.
CPC ............. *H02H 3/10* (2013.01); *H01H 71/10* (2013.01); *H01H 71/123* (2013.01); *H02H 1/0007* (2013.01); *H02H 3/085* (2013.01); *H02H 3/093* (2013.01); *H02H 3/0935* (2013.01); *H02H 6/005* (2013.01); *H01H 71/125* (2013.01); *H01H 71/22* (2013.01)

(58) Field of Classification Search
USPC ...................... 361/42–50, 103, 106
See application file for complete search history.

(56) References Cited

U.S. PATENT DOCUMENTS

| | | | | |
|---|---|---|---|---|
| 8,605,402 B2* | 12/2013 | Ward | ...................... | G01K 3/005 361/103 |
| 2001/0019299 A1* | 9/2001 | Gotzig | ................... | H02H 6/005 337/14 |
| 2008/0012669 A1* | 1/2008 | Davison | ................. | H01H 71/22 335/44 |
| 2008/0253041 A1* | 10/2008 | Kuivalainen | .......... | H02H 6/005 361/25 |
| 2009/0122454 A1* | 5/2009 | Gayowsky | ............. | H02H 6/005 361/103 |
| 2012/0283970 A1* | 11/2012 | Boehm | .............. | G01R 31/3828 702/64 |
| 2014/0177118 A1* | 6/2014 | Elms | ...................... | H02H 5/047 361/93.8 |

* cited by examiner

*Primary Examiner* — Danny Nguyen
(74) *Attorney, Agent, or Firm* — Eckert Seamans Cherin & Mellott, LLC

(57) ABSTRACT

A circuit interrupter for protecting a protected circuit includes separable contacts, an operating mechanism structured to trip open the separable contacts, a current sensor structured to sense a current flowing through the protected circuit, a temperature sensor structured to sense a temperature of the protected circuit proximate the current sensor, and a processor configured to select a trip time based on the sensed current, to adjust the selected trip time based on the sensed temperature, and to cause the operating mechanism to trip open the separable contacts when the adjusted selected trip time is reached.

20 Claims, 5 Drawing Sheets

CIRCUIT INTERRUPTER WITH TEMPERATURE COMPENSATION AND METHOD OF OPERATING A CIRCUIT INTERRUPTER

BACKGROUND

Field

The disclosed concept relates generally to circuit interrupters, and in particular, to circuit interrupters with temperature compensation. The disclosed concept is also related to methods of operating circuit interrupters.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Some types of circuit breakers include a bimetal strip to provide thermal protection. Current in the protected circuit flows through the bimetal strip. Increasing current flowing through the bimetal strip causes the bimetal strip to heat up and bend. After the bimetal strip heats up enough and bends far enough, it releases a latch in the circuit breaker that causes the circuit breaker to trip. Over a period of time, low overcurrent conditions (e.g., an overcurrent that does not cause the circuit breaker to instantaneously trip) will cause the bimetal strip to heat up and cause a trip.

One problem with the bimetal strip is that it is affected by the ambient temperature. For example, when the circuit breaker is installed in an outdoor load center in a cold area, the ambient temperature in the circuit breaker will be colder than normal. The ambient temperature may keep the bimetal trip cold enough that it does not heat up sufficiently to cause a trip even when a low overcurrent condition is present.

There is room for improvement in circuit interrupters. There is also room for improvement in methods of operating circuit interrupters.

SUMMARY

These needs and others are met by embodiments of the disclosed concept in which a circuit interrupter selects a trip time based on sensed current and adjusts the selected trip based on sensed temperature.

In accordance with one aspect of the disclosed concept, a circuit interrupter for protecting a protected circuit comprises: separable contacts; an operating mechanism structured to trip open the separable contacts; a current sensor structured to sense a current flowing through the protected circuit; a temperature sensor structured to sense a temperature of the protected circuit proximate the current sensor; and a processor configured to select a trip time based on the sensed current, to adjust the selected trip time based on the sensed temperature, and to cause the operating mechanism to trip open the separable contacts when the adjusted selected trip time is reached.

In accordance with another aspect of the disclosed concept, a method of operating a circuit interrupter comprises: sensing a current flowing through a circuit protected by the circuit interrupter with a current sensor; sensing a temperature of a conductor proximate the current sensor with a temperature sensor; selecting a trip time based on the sensed current; adjusting the selected trip time based on the sensed temperature; and causing the circuit interrupter to trip when the adjusted selected trip time is reached.

In accordance with another aspect of the disclosed concept, a non-transitory computer readable medium storing one or more programs, including instructions, which when executed by a computer, causes the computer to perform a method of operating a circuit interrupter comprising: sensing a current flowing through a circuit protected by the circuit interrupter with a current sensor; sensing a temperature of a conductor proximate the current sensor with a temperature sensor; selecting a trip time based on the sensed current; adjusting the selected trip time based on the sensed temperature; and causing the circuit interrupter to trip when the adjusted selected trip time is reached.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
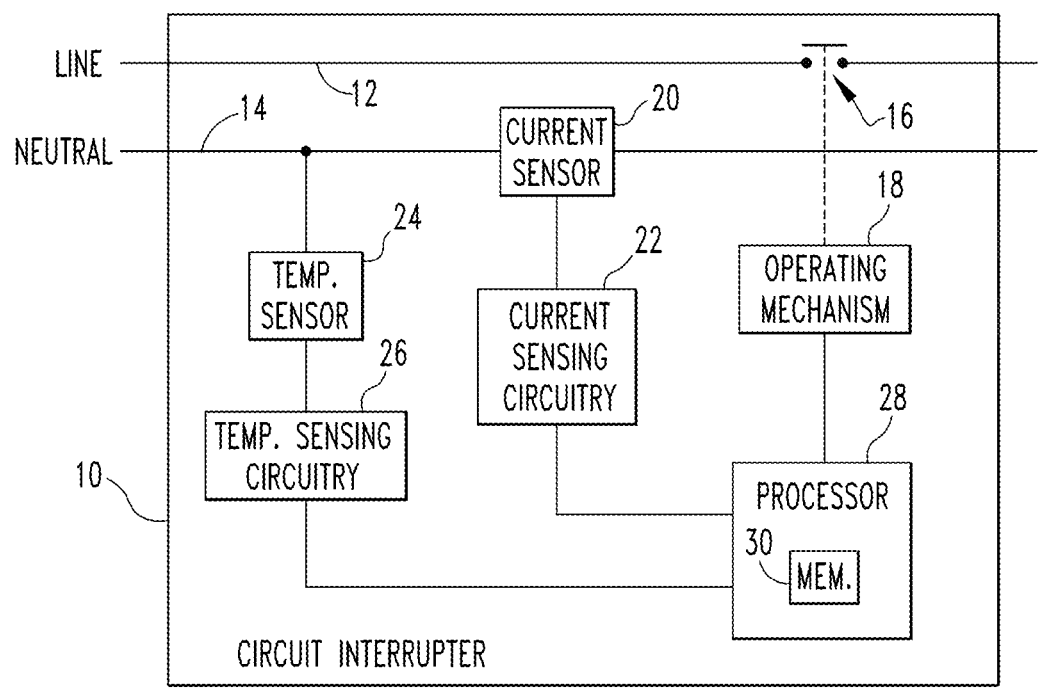
FIG. 1 is a schematic diagram of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

Figure 2:
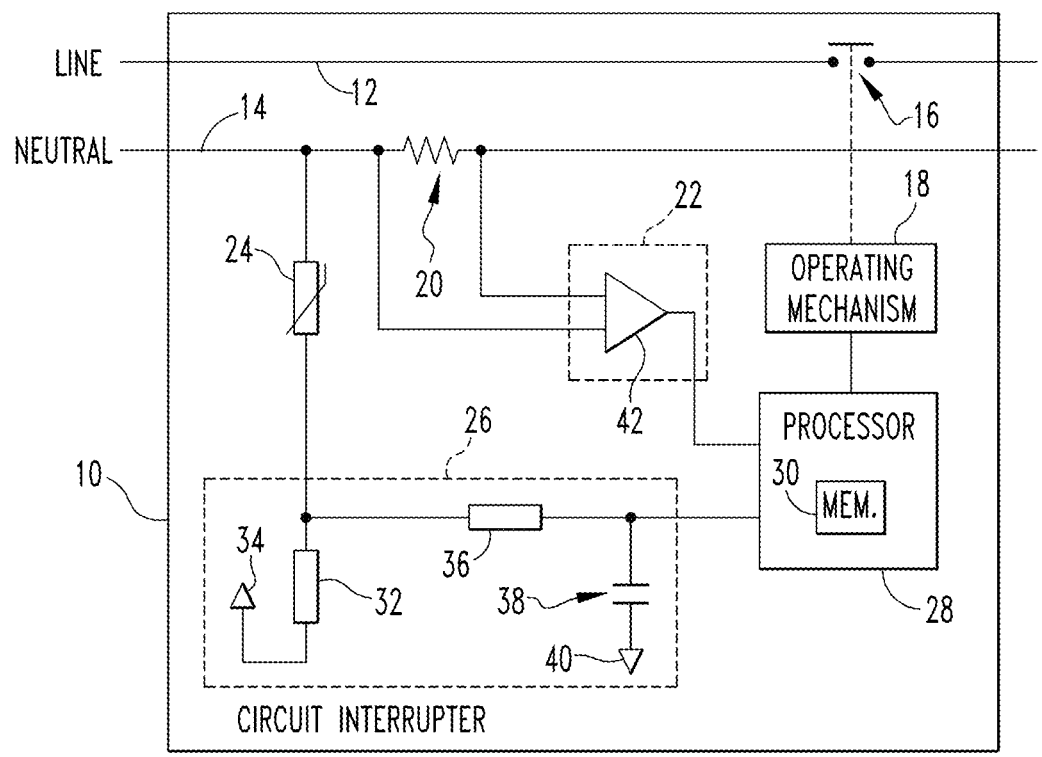
FIG. 2 is a schematic diagram of the circuit interrupter of FIG. 1 shown in more detail in accordance with an example embodiment of the disclosed concept.

FIG. 1 is a schematic diagram of a circuit interrupter 10 in accordance with an example embodiment of the disclosed concept and FIG. 2 is a schematic diagram of the circuit interrupter 10 of FIG. 1 shown in more detail in accordance with an example embodiment of the disclosed concept. The circuit interrupter 10 is structured to be electrically connected on a protected circuit between a power source (not shown) and a load (not shown). Power from the power source is conducted through the circuit interrupter to the load via line and neutral conductors 12,14 included in the circuit interrupter 10.

The circuit interrupter 10 includes separable contacts 16. The separable contacts 16 are disposed along the line conductor 12 and tripping open the separable contacts 16 stops current from flowing through the line conductor 12. The circuit interrupter 10 further includes an operating mechanism 18 structured to trip open the separable contacts 16. In some example embodiments of the disclosed concept, the operating mechanism 18 is a solenoid structured to activate to cause the separable contacts 16 to trip open. Passing sufficient current through a coil of the solenoid causes the solenoid to activate and cause the separable contacts 16 to trip open. However, it will be appreciated by those having ordinary skill in the art that other types of operating mechanisms may be employed in the circuit interrupter 10 without departing from the scope of the disclosed concept.

The circuit interrupter 10 further includes a current sensor 20 and a temperature sensor 24 disposed proximate the current sensor 20. The circuit interrupter 10 further includes a processor 28. The current sensor 10 is structured to sense current flowing through the protected circuit and the temperature sensor 24 is structured to sense a temperature of a conductor proximate the current sensor 20 (e.g., without limitation, the neutral conductor 14). The processor 28 is structured to determine if and when to initiate a trip based on the sensed current and the sensed temperature. It will be appreciated by those having ordinary skill in the art that in some example embodiments of the disclosed concept, the processor 28 may be part of an electronic trip unit of the circuit interrupter 10.

In some example embodiments of the disclosed concept, the current sensor 20 is a current sensing shunt (see FIG. 2) electrically connected to the neutral conductor 14. Also, in some example embodiments of the disclosed concept, the current sensor 20 has a variation equal to or less than 8%. The circuit interrupter 10 may further include current sensing circuitry 22 (e.g., without limitation, a differential amplifier 42) that conditions the output of the current sensor 20 to a suitable signal for input to the processor 28.

In some example embodiments of the disclosed concept, the temperature sensor 24 is a thermistor 24 (see FIG. 2). The thermistor 24 may be electrically connected to the neutral conductor 14 proximate the current sensor 20. In the example embodiment shown in FIG. 2, one end of the thermistor 24 is electrically connected to the neutral conductor 12. A first resistor 32 is electrically connected between the other end of the thermistor 24 and a supply voltage 34 (e.g., without limitation, 3.3V). A second resistor 36 has a first end electrically connected to a point between the thermistor 24 and the first resistor 32 and a second end electrically connected to an input of the processor 28. A capacitor 38 may be electrically connected between the input of the processor 28 and ground 40. The arrangement of the first and second resistors 32,36, and the capacitor 40 form temperature sensing circuitry 26 which conditions the output of the thermistor 24 to a signal suitable for use by the processor 28 and that is proportional to the temperature of the neutral conductor 14 proximate the current sensor.

The thermistor 24 is structured to vary in resistance based on temperature. In some example embodiments of the disclosed concept the thermistor 24 has a temperature range of about −40° C. to 100° C. Also, in some example embodiments of the disclosed concept, the thermistor 24 has a variation of equal to or less than 5%.

In the example embodiment shown in FIG. 2, the current sensing shunt 20 is used as the current sensor 20 and the thermistor 24 is used as the temperature sensor 24. However, it will be appreciated by those having ordinary skill in the art that different types of current sensors and temperature sensors may be employed without departing from the scope of the disclosed concept.

The processor 28 includes an associated memory 30. The memory 30 may be included in the processor 28 or as a separate component. The processor 28 may be, for example and without limitation, a microprocessor, a microcontroller, or some other suitable processing device or circuitry, that interfaces with the memory or another suitable memory. The memory 30 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. A plurality of trip time curves may be stored in the memory 30. The memory 30 may also store one or more routines that the processor 28 is structured to execute.

The processor 28 is configured to select a trip time based on the current sensed by the current sensor 20. The processor 28 is also configured to adjust the selected trip time based on the temperature sensed by the temperature sensor 24. The processor 28 is further configured to cause the operating mechanism 18 to trip open the separable contacts 16 when the adjusted selected trip time is reached.

Figure 3:
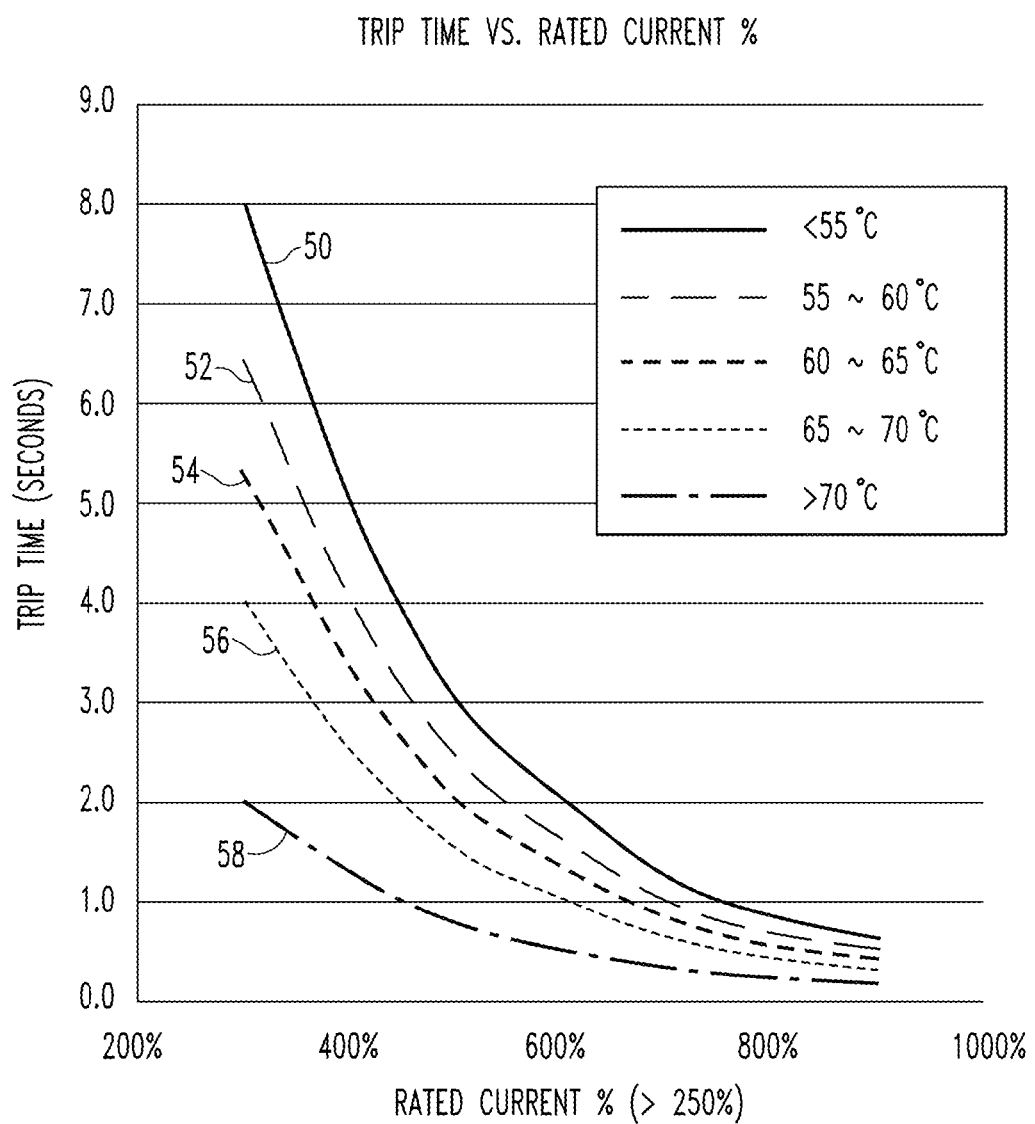
FIG. 3 is a chart of a portion of a predetermined trip time curve and adjusted trip time curves in accordance with an example embodiment of the disclosed concept.
Figure 4:
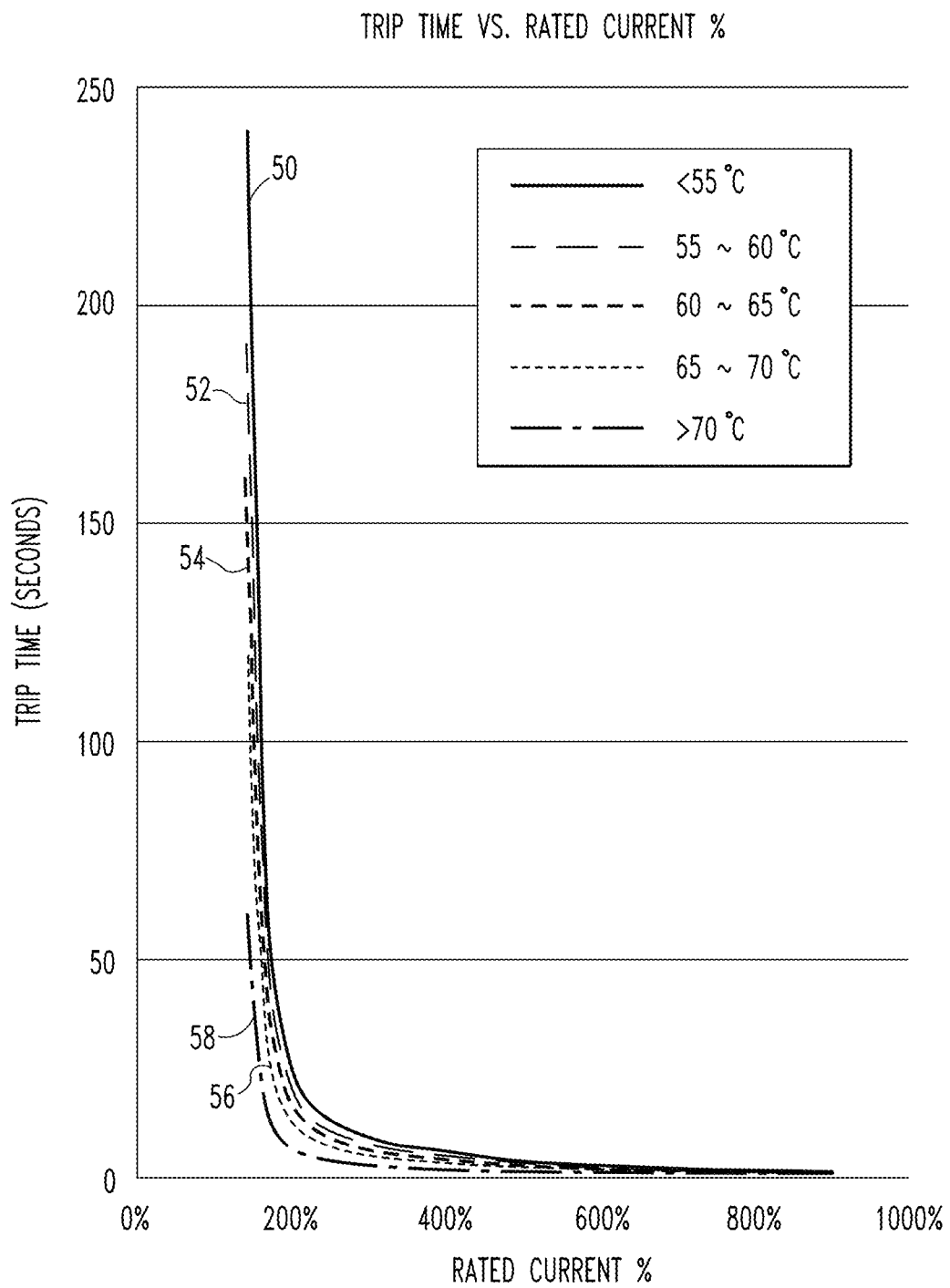
FIG. 4 is a chart of the full trip time curve and adjusted trip time curves of FIG. 3 in accordance with an example embodiment of the disclosed concept.

In some example embodiments of the disclosed concept, the trip time is selected from a predetermined trip time curve. An example of a predetermined trip time curve is shown in FIGS. 3 and 4. Referring to FIG. 3, a predetermined trip time curve 50 corresponding to temperature below 55° C. is shown. The predetermined trip time curve 50 associated trip time with a percentage of rated current ($I_{rated}$). In some example embodiments of the disclosed concept, the processor 28 is configured to select the trip time from the predetermined trip time curve 50. For example, at a current of $300\%*I_{rated}$, the processor 28 will select a trip time of 8 s.

FIGS. 3 and 4 also illustrate adjusted trip time curves 52,54,56,58. The adjusted trip time curves 52,54,56,58 are adjusted with respect to the predetermined trip time curve 50 based on the sensed temperature. For example, each of the adjusted trip time curves corresponds to a distinct range of temperatures (curve 52 is associated with 55-60° C., curve 54 is associated with 60-65° C., curve 56 is associated with 65-70° C., and curve 58 is associated with temperatures greater than 70° C.). The predetermined trip time curve 50 is associated with temperatures less than 55° C. In example embodiment of the disclosed concept, when the sensed current is $300\%*I_{rated}$ and the temperature is 80° C., the processor 28 will adjust the trip time to the value in the adjusted trip time curve 58 corresponding to $300\%*I_{rated}$, which is 2 s.

FIG. 3 illustrates a portion of the predetermined trip time curve 50 and the adjusted trip time curves 52,54,56,58 and FIG. 4 illustrates the complete predetermined trip time curve 50 and the adjusted trip time curves 52,54,56,58. FIG. 3 shows that the curves have different trip times for a given current. While FIG. 4 illustrates the complete curves. FIG. 3 is presented to highlight the differences in trip times between curves as this point is not able to be clearly illustrated in FIG. 4 due to the range of data values. In some example embodiments of the disclosed concept, the predetermined trip time curve 50 has minimum and maximum current values defining its range (e.g., without limitation, 135%*$I_{rated}$ to 900%*$I_{rated}$). The processor 28 may be configured to first determine whether the sensed current falls within the range of current values covered by the predetermined trip time curve before proceeding with selecting a trip time and adjusting the selected trip time.

It will be appreciated by those having ordinary skill in the art that the trip time curves shown in FIGS. 3 and 4 are just one example of values that may be employed in conjunction with the disclosed concept. It will be appreciated by those having ordinary skill in the art that different values for a predetermined trip time curve and adjusted trip time curves may be employed without departing from the scope of the disclosed concept.

In some example embodiments of the disclosed concept, the processor 28 is configured to determine which of a plurality of ranges of temperatures (e.g., the temperature ranges shown in FIGS. 3 and 4) is within. In some example embodiments of the disclosed concept, the processor 28 may adjust the selected trip time by an adjustment amount associated with the range of temperatures that the sensed temperature is within. Each range of temperatures may be distinct from each other and each may have a different adjustment amount. For example, the adjustment amount may be a percentage of the selected trip time. For example, when the temperature is greater than 70° C., the adjustment amount may be 25% and the adjusted selected trip time may be reached by multiplying the selected trip time by 25%. In some example embodiments of the disclosed concept, the percentage used as the adjustment amount will decrease as the range of temperatures increases. Those having ordinary skill in the art will appreciate that suitable adjustment amounts associated with each range of temperatures may be selected without departing from the scope of the disclosed concept.

In some example embodiments of the disclosed concept, the processor 28 may use a counter to determine when the trip time is reached. For example, the processor 28 may select a trip time based on the sensed temperature using the predetermined trip time curve 50. The processor 28 may periodically increment the counter (e.g., once per second) when the sensed current is within the range of the predetermined trip time curve 50. If the current falls below the minimum of the predetermined trip time curve's 50 range, the processor 28 may reset the counter. When the counter reaches the a trip time counter (e.g., without limitation, a value equal to the selected trip time), the processor 28 may cause the operating mechanism 18 to trip open the separable contacts 16. The processor 28 may provide temperature compensation by adjusting the amount that the counter is incremented by based on the sensed temperature. For example, if the temperature is greater than 70° C., the processor 28 may increment the counter by 4 instead of 1. In this manner, the counter will reach the trip time counter four times faster than if the increment were not adjusted. As such, the selected trip time is effectively adjusted. It will be appreciated by those having ordinary skill in the art that suitable values of the increment adjustment amount associated with each range of temperatures may be selected without departing from the scope of the disclosed concept.

In some example embodiments of the disclosed concept, the processor 28 is structured to provide temperature compensation by adjusting the selected trip time by reducing the selected trip time when the sensed temperature is above a predetermined temperature (e.g., without limitation, 55° C.). The amount that the processor 28 adjusts the selected trip time by may be different depending on how high the temperature is. In some example embodiments of the disclosed concept, for a given current, as the temperature increases, the amount by which processor 28 adjusts the selected trip time increases. In some example embodiments of the disclosed concept, the amount by which the processor 28 adjusts the selected trip time may be selected based on which range of temperature (e.g., without limitation, the ranges of temperature shown in FIGS. 3 and 4) the sensed temperature is within. However, it will be appreciated by those having ordinary skill in the art that the amount by which the processor 28 adjusts the selected trip time may be linearly related to the sensed temperature.

The adjusted trip time curves 52,54,56,58 shown in FIGS. 3 and 4 are provided to illustrate an effect of the disclosed concept. The disclosed concept may be implemented without storing the adjusted trip time curves 52,54,56,58. For example, the adjusted trip time may be determined on a real-time basis based on the sensed temperature. For example, the selected trip time may be adjusted by an amount based on the sensed temperature. Alternatively, it will be appreciated by those having ordinary skill in the art that the adjusted trip time curves 52,54,56,58 may be stored and the selected trip time may be adjusting by looking up a corresponding trip time from the curve corresponding to the sensed temperature and adjusting the selected trip time by setting to the trip time in the selected adjusted trip time curve 52,54,56,58.

In traditional circuit breakers, low overcurrent conditions are detected based on sensed temperature. Such a condition may not be detected due to low ambient temperatures that may prevent conductors from reaching a threshold temperature. By selecting a trip time based on the sensed current, the disclosed concept avoids low ambient temperatures masking a low overcurrent condition. In circuit breakers that operate strictly based on sensed current, the temperature of the conductors is not taken into account. The disclosed concept provides temperature compensation by adjusting the trip time based on the sensed temperature. In a situation where a conductor is already heated (e.g., due to a previous overcurrent condition), the disclosed concept will be able to detect the heated conductor and adjust the trip time accordingly. The disclosed concept is thus able to initiate a trip more quickly when the conductor is already heated. In circuit breakers that operate strictly based on sensed current, the circuit breaker will wait the full amount of time in its settings (e.g., without limitation, 240 s) before tripping again. Allowing a high temperature condition to persist can lead to damage to circuit and components, a situation which the disclosed concept avoids by providing temperature compensation.

Figure 5:
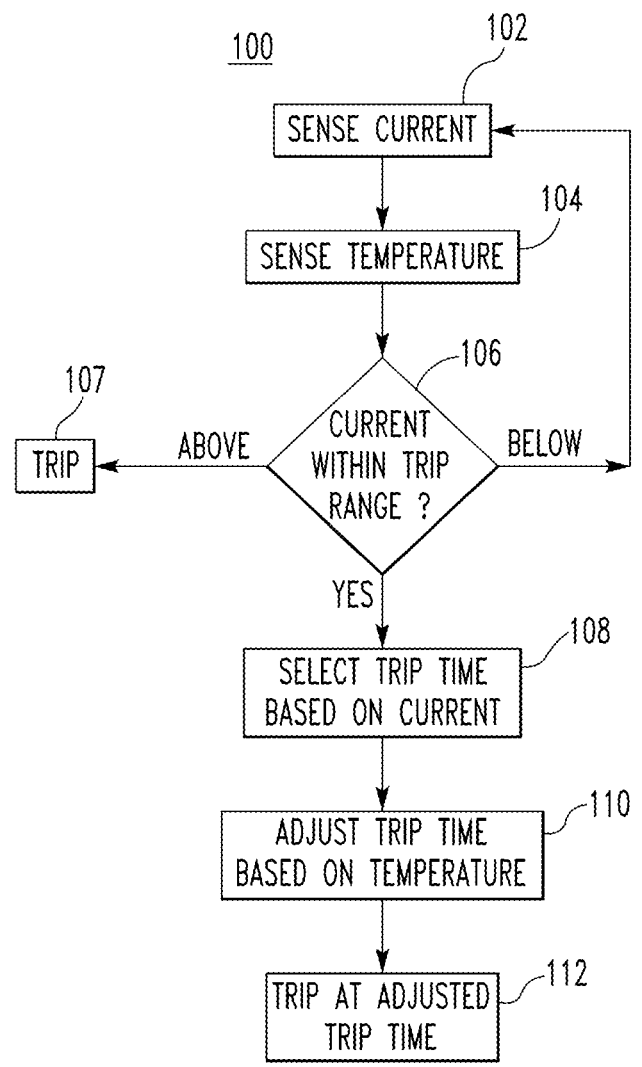
FIG. 5 is a flowchart of a method of operating a circuit interrupter in accordance with an example embodiment of the disclosed concept.

FIG. 5 is a flowchart of a method 100 of operating a circuit interrupter in accordance with an example embodiment of the disclosed concept. The method of FIG. 5 may be implemented, for example, in the circuit interrupter 10 of FIGS. 1 and 2. The method of FIG. 5 may also be stored as a routine in the memory 30 the circuit interrupter 10 of FIGS. 1 and 2 and executed by the processor 28.

At 102, the current in the circuit protected by the circuit interrupter 10 is detected with the current sensor 20. At 104, the temperature of a conductor (e.g., without limitation, the neutral conductor 14) proximate the current sensor 20 is sensed with a temperature sensor 24. At 106, the processor 28 determines whether the sensed current is within a trip range. The trip range may be, for example and without limitation, the range of currents covered by the predetermined trip time curve 50 of FIG. 4 (e.g., without limitation, 135%*$I_{rated}$ to 900%*$I_{rated}$). If the sensed current is below the trip range, the process returns to 102. If the sensed current is above the trip range, a trip is initiated at 107. If the sensed current is within the trip range the process proceeds to 108.

At 108, the processor 28 selects a trip time based on the sensed current. The trip time may be selected from the predetermined trip time curve 50 of FIGS. 3 and 4. At 110, the selected trip time is adjusted based on the sensed temperature. The selected trip time may be adjusted by a different amounts based on which one of ranges of temperatures the sensed temperature falls within, as has been previously described herein. At 112, the processor 28 initiates a trip when the adjusted selected trip time is reached.

Figure 6:
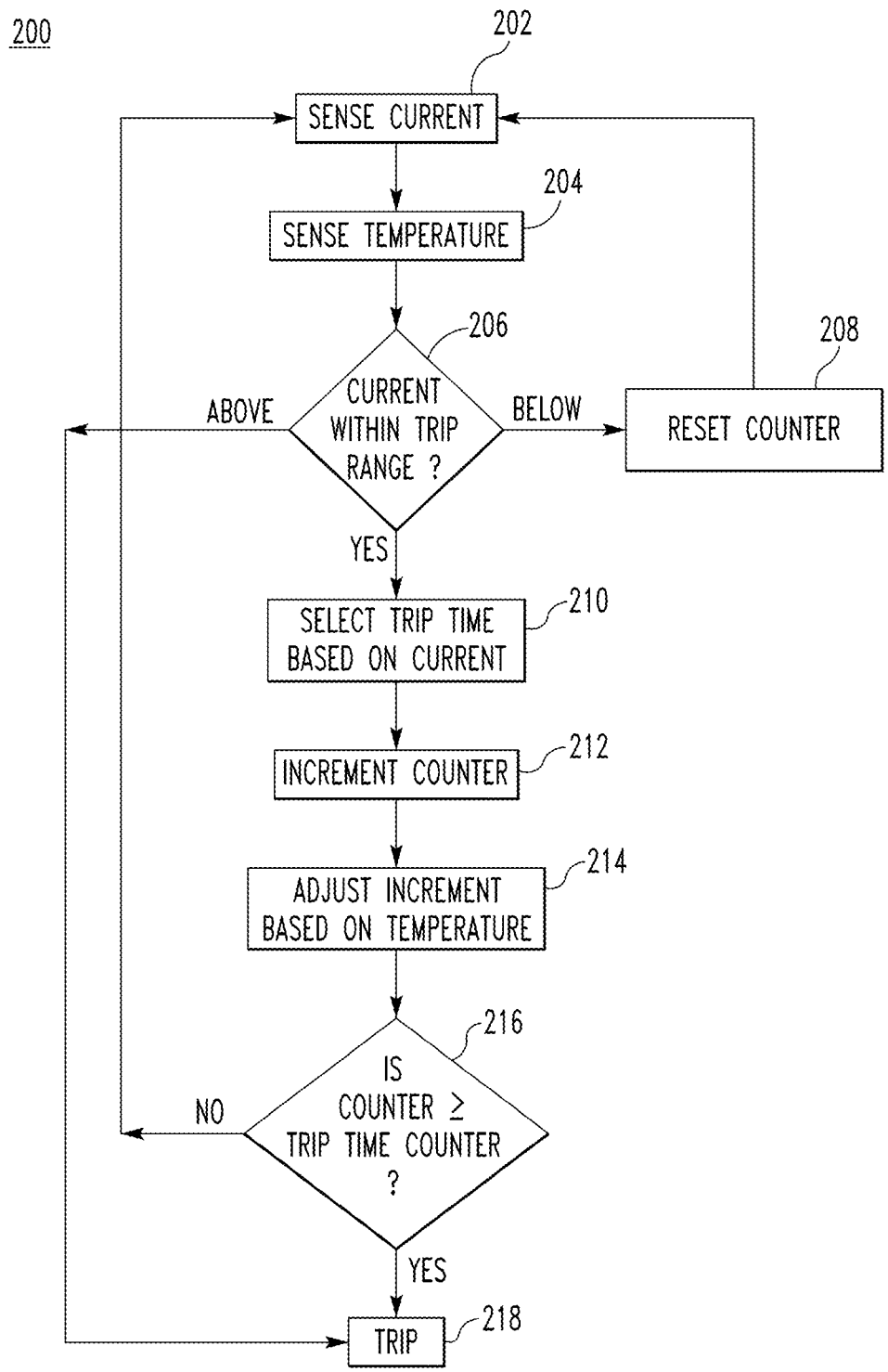
FIG. 6 is a flowchart of a method of operating a circuit interrupter in accordance with another example embodiment of the disclosed concept.

FIG. 6 is a flowchart of a method 200 of operating a circuit interrupter in accordance with an example embodiment of the disclosed concept. The method of FIG. 6 may be implemented, for example, in the circuit interrupter 10 of FIGS. 1 and 2. The method of FIG. 6 may also be stored as a routine in the memory 30 the circuit interrupter 10 of FIGS. 1 and 2 and executed by the processor 28.

At 202, the current in the circuit protected by the circuit interrupter 10 is detected with the current sensor 20. At 204, the temperature of a conductor (e.g., without limitation, the neutral conductor 14) proximate the current sensor 20 is sensed with a temperature sensor 24. At 206, the processor 28 determines whether the sensed current is within a trip range. The trip range may be, for example and without limitation, the range of currents covered by the predetermined trip time curve 50 of FIG. 4 (e.g., without limitation, 135%*$I_{rated}$ to 900%*$I_{rated}$). If the sensed current is below the trip range, the process proceeds to 208 and resets a counter and then returns to 202. If the sensed current is above the trip range, a trip is initiated at 218. If the sensed current is within the trip range the process proceeds to 210.

At 210, the processor 28 selects a trip time based on the sensed current. The trip time may be selected from the predetermined trip time curve 50 of FIGS. 3 and 4. At 212, the processor 28 increments the counter. At 214, the processor 28 adjusts the amount the counter is incremented by based on the sensed temperature. The amount the increment is adjusted by may differ based on which one of ranges of temperatures the sensed temperature falls within, as has been previously described herein. At 216, the processor 28 determines whether the counter is greater than or equal to a trip time counter. The trip time counter may have a value equal to or greater than the selected trip time. If the counter is less than the trip time counter, the process proceeds to 202. If the counter is greater than or equal to the trip time counter, the process proceed to 218 and the processor 28 initiates a trip. As the process repeats, the counter is periodically incremented until it is reset or a trip is initiated.

The methods 100,200 of FIGS. 5 and 6 may periodically repeat (i.e., without limitation, repeat at is intervals) until a trip is initiated.

It will be appreciated by those having ordinary skill in the art that the methods illustrated in FIGS. 5 and 6 may be implemented in the circuit interrupter 10 of FIGS. 1 and 2. However, it will also be appreciated that the methods of FIGS. 5 and 6 may also be implemented in other types of circuit interrupters, circuit breakers, or other suitable devices.

In some example embodiments of the disclosed concept, the circuit interrupter 10 may include a magnetic (e.g., without limitation, a trip coil) and/or thermal (e.g., without limitation, a bi-metal piece) trip mechanism that are found in traditional circuit breakers. The magnetic and/or thermal trip mechanisms may be provided in addition to the processor 28 and may serve, for example, as a backup trip mechanism in case the processor 28 fails to initiate a trip properly.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter for protecting a protected circuit, the circuit interrupter comprising:
   separable contacts;
   an operating mechanism structured to trip open the separable contacts;
   a current sensor structured to sense a current flowing through the protected circuit;
   a temperature sensor structured to sense a temperature of the protected circuit proximate the current sensor; and
   a processor configured to select a trip time based on the sensed current, to adjust the selected trip time based on the sensed temperature, and to cause the operating mechanism to trip open the separable contacts when the adjusted selected trip time is reached.

2. The circuit interrupter of claim 1, wherein the selected trip time is selected from a predetermined trip time curve.

3. The circuit interrupter of claim 1, wherein the processor is configured to adjust the selected trip time based on the sensed temperature by reducing the selected trip time when the sensed temperature is above a predetermined temperature.

4. The circuit interrupter of claim 1, wherein the processor is configured to determine which one of a plurality of ranges of temperature the sensed temperature is within.

5. The circuit interrupter of claim 4, wherein the processor is configured to adjust the selected trip time by an adjustment amount associated with the one of the plurality of ranges of temperature the sensed temperature is within; and wherein each of the plurality of ranges of temperature are associated with a different adjustment amount.

6. The circuit interrupter of claim 4, wherein the processor is configured to determine that the adjusted selected trip time is reached when a counter reaches a trip time counter based on the selected trip time; wherein the processor is configured to periodically increment the counter; and wherein the processor is configured adjust an amount the counter is incremented by based on the one of the plurality of ranges of temperature the sensed temperature is within.

7. The circuit interrupter of claim 1, wherein the current sensor includes a shunt.

8. The circuit interrupter of claim 7, wherein the shunt has a variation of less than 8%.

9. The circuit interrupter of claim 1, wherein the temperature sensor is a thermistor.

10. A method of operating a circuit interrupter, the method comprising:
sensing a current flowing through a circuit protected by the circuit interrupter with a current sensor;
sensing a temperature of a conductor proximate the current sensor with a temperature sensor;
selecting a trip time based on the sensed current;
adjusting the selected trip time based on the sensed temperature; and
causing the circuit interrupter to trip when the adjusted selected trip time is reached.

11. The method of claim 10, wherein the selected trip time is selected from a predetermined trip time curve.

12. The method of claim 10, wherein adjusting the selected trip time includes adjusting the selected trip time based on the sensed temperature by reducing the selected trip time when the sensed temperature is above a predetermined temperature.

13. The method of claim 10, further comprising:
determining which one of a plurality of ranges of temperature the sensed temperature is within.

14. The method of claim 13, wherein adjusting the selected trip time includes adjusting the selected trip time by an adjustment amount associated with the one of the plurality of ranges of temperature the sensed temperature is within; and wherein each of the plurality of ranges of temperature are associated with a different adjustment amount.

15. The method of claim 13, further comprising:
determining that the adjusted selected trip time is reached when a counter reaches a trip time counter based on the selected trip time;
periodically incrementing the counter; and
adjusting an amount the counter is incremented by based on the one of the plurality of ranges of temperature the sensed temperature is within.

16. The method of claim 10, wherein the current sensor includes a shunt.

17. The method of claim 16, wherein the shunt has a variation of less than 8%.

18. The method of claim 10, wherein the temperature sensor is a thermistor.

19. A non-transitory computer readable medium storing one or more programs, including instructions, which when executed by a computer, causes the computer to perform a method of operating a circuit interrupter, the method comprising:
sensing a current flowing through a circuit protected by the circuit interrupter with a current sensor;
sensing a temperature of a conductor proximate the current sensor with a temperature sensor;
selecting a trip time based on the sensed current;
adjusting the selected trip time based on the sensed temperature; and
causing the circuit interrupter to trip when the adjusted selected trip time is reached.

20. The non-transitory computer readable medium of claim 19, wherein adjusting the selected trip time includes adjusting the selected trip time based on the sensed temperature by reducing the selected trip time when the sensed temperature is above a predetermined temperature.

* * * * *